United States Patent [19]

Watanabe

[11] Patent Number: 5,074,812
[45] Date of Patent: Dec. 24, 1991

[54] TORSIONAL DAMPER FOR MARINE PROPULSION ENGINE

[75] Inventor: Eifu Watanabe, Hamamatsu, Japan

[73] Assignee: Sanshin Kogyo Kabushiki Kaisha, Hamamatsu, Japan

[21] Appl. No.: 467,784

[22] Filed: Jan. 19, 1990

[30] Foreign Application Priority Data

Jan. 20, 1989 [JP] Japan .................................. 1-9999

[51] Int. Cl.⁵ ............................................. B63H 1/15
[52] U.S. Cl. ...................................... 440/52; 74/574; 464/180
[58] Field of Search .................... 440/52, 83; 464/180; 74/574; 192/58 B

[56] References Cited

U.S. PATENT DOCUMENTS

| | | | |
|---|---|---|---|
| 2,724,983 | 11/1955 | O'Connor | 464/180 |
| 3,901,101 | 8/1975 | McGavern | 74/574 |
| 4,787,868 | 11/1988 | Hoshiba et al. | 440/52 |
| 4,925,409 | 5/1990 | Johnson | 440/52 |

*Primary Examiner*—Jesus D. Sotelo
*Attorney, Agent, or Firm*—Ernest A. Beutler

[57] ABSTRACT

An outboard motor and improved torsional vibration damper adapted to be supported on the lower end of the output shaft of the engine of the outboard motor. The torsional vibration damper is formed with an oil receiving groove in which oil and fuel which may drain from the engine can collect without affecting the elastomeric sleeve. A drain hole permits the oil to be relieved from the oil collecting groove and this drain hole is threaded so as to receive a puller for pulling the torsional damper from the engine output shaft.

15 Claims, 3 Drawing Sheets

TORSIONAL DAMPER FOR MARINE PROPULSION ENGINE

BACKGROUND OF THE INVENTION

This invention relates to a torsional damper for a marine propulsion engine and more particularly to an improved torsional damper for use with engines mounted for rotation with their output shafts extending about a vertical axis.

In many applications, an internal combustion engine is operated so that its output shaft rotates about a vertically extending axis. Such applications are common in connection with outboard motors so as to facilitate the driving connection between the engine output shaft and the drive shaft of the outboard motor, which also rotates about a vertically extending axis. With this type of motor, as with many engine applications, it is desirable to incorporate a torsional damper on the engine output shaft for absorbing the pulsations in the output shaft and to reduce vibration and noise. In conjunction with outboard motors, it has recently also been realized that the positioning of the torsional damper at the lower end of the engine output shaft will serve the function of dampening vibrations not only in the engine output shaft but also in the drive shaft and lower unit.

The positioning of the torsional damper at the lower end of the engine output shaft, however, has some difficulties. That is, conventionally, it is the practice to employ a seal between the engine crankshaft and the engine output shaft so as to prevent the leakage of liquids from the crankcase. These liquids may constitute either lubricating oil only or lubricating oil and fuel when the engine is a two-cycle engine.

Since most torsional vibration dampers comprise an inertial member that is bonded to a hub by an elastomeric sleeve so as to provide vibration damping, the accumulation of oil and/or fuel on the damper can give rise to certain problems. That is, the elastomeric material normally employed tends to swell in the presence of fuel and/or lubricants. If the elastomeric material swells, the damper will become, in effect, more rigid and cannot serve its intended purpose.

It is, therefore, a principal object of this invention to provide an improved torsional damper for a marine propulsion engine.

It is a further object of this invention to provide an improved torsional damper for an engine that operates with its output shaft rotating about a vertical axis and wherein the damper will not be prone to deleterious effects caused by lubricant and/or fuel leaking onto it.

It is a further object of this invention to provide an improved and simplified drain arrangement for protecting a torsional damper from the adverse effects of fuel and/or lubricant.

SUMMARY OF THE INVENTION

This invention is adapted to be embodied in a torsional damper for an internal combustion engine having its output shaft journaled for rotation about a vertically extending axis in an engine housing Seal means for sealing the output shaft relative to the engine housing are provided. A torsional vibration damper is affixed to the output shaft adjacent the seal means for damping pulsations in the output shaft. In accordance with the invention, an oil collection groove is formed in the upper surface of the torsional vibration damping means for entrapping liquids seeping past the seal means.

DETAILED DESCRIPTION OF THE PREFERRED EMBODIMENT

Figure 1:
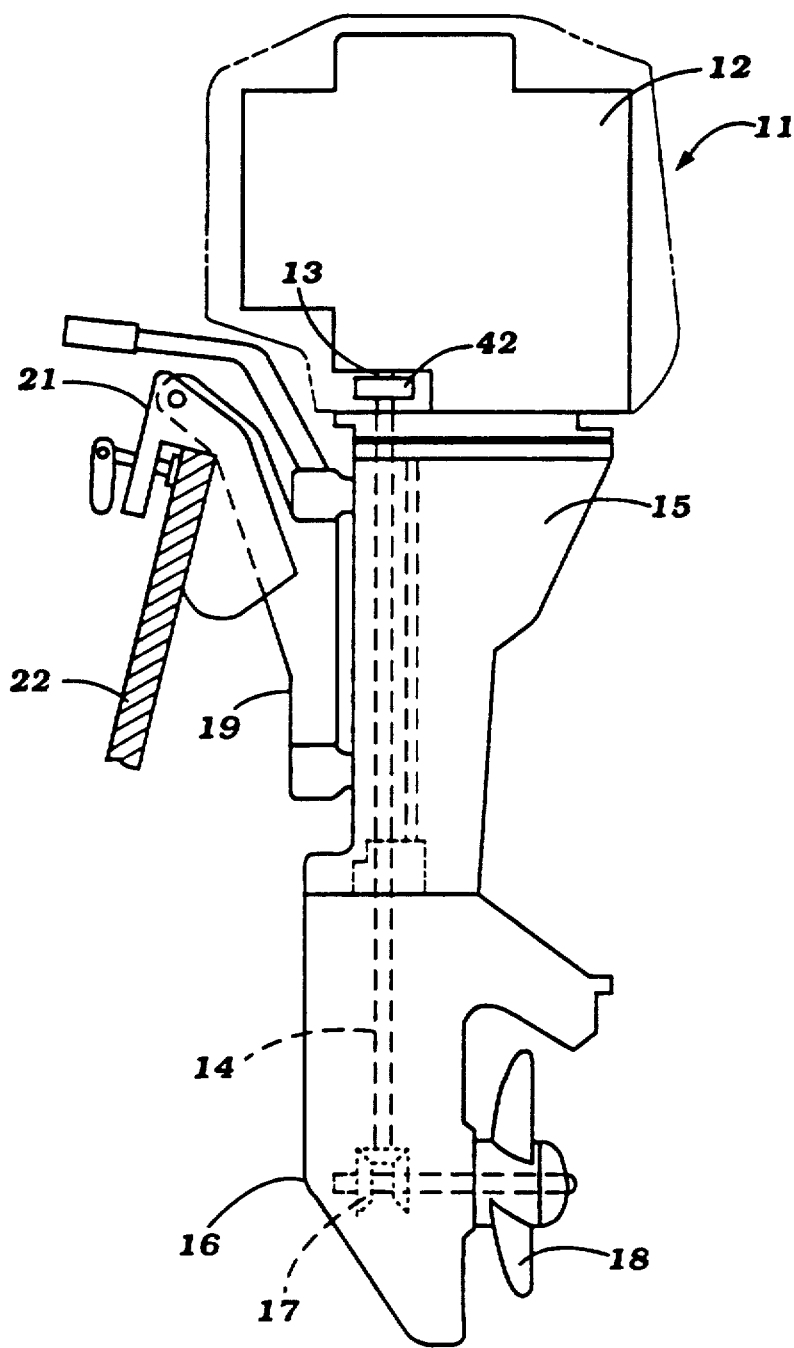
FIG. 1 is a side elevational view of an outboard motor constructed in accordance with an embodiment of the invention with a portion shown in phantom and another portion broken away.

Referring first in detail to FIG. 1, an outboard motor constructed in accordance with an embodiment of the invention is identified generally by the reference numeral 11. Although the invention is adapted to be used particularly with outboard motors, it will be understood by those skilled in the art that the invention may be used in a wide variety oil other applications. The invention, however, has particular utility in conjunction with outboard motors since such applications normally employ the use of engines having their output shafts rotatable about a vertically extending axis.

The outboard motor 11 includes a power head comprised of an internal combustion engine 12 which, as has been noted, is supported so that its output shaft (a crankshaft 13) rotates about a vertically extending axis. The crankshaft 13 is coupled, in a manner to be described, to the upper end of a drive shaft 14 that is journaled within a drive shaft housing 15. The drive shaft 14 extends into a lower unit 16 wherein it drives a conventional bevel gear forward, neutral, reverse transmission 17 for driving a propeller 18 in selected forward or reverse directions.

The outboard motor 11 further includes a swivel bracket 19 for steering of the outboard motor and which is connected to a clamping bracket 21 for tilt and trim movement. The clamping bracket 21 carries means for detachably affixing the outboard motor 11 to a transom 22 of a watercraft in a well known manner. Since the construction of the outboard motor per se forms no part of the invention, a further description of it is believed to be unnecessary.

Figure 2:
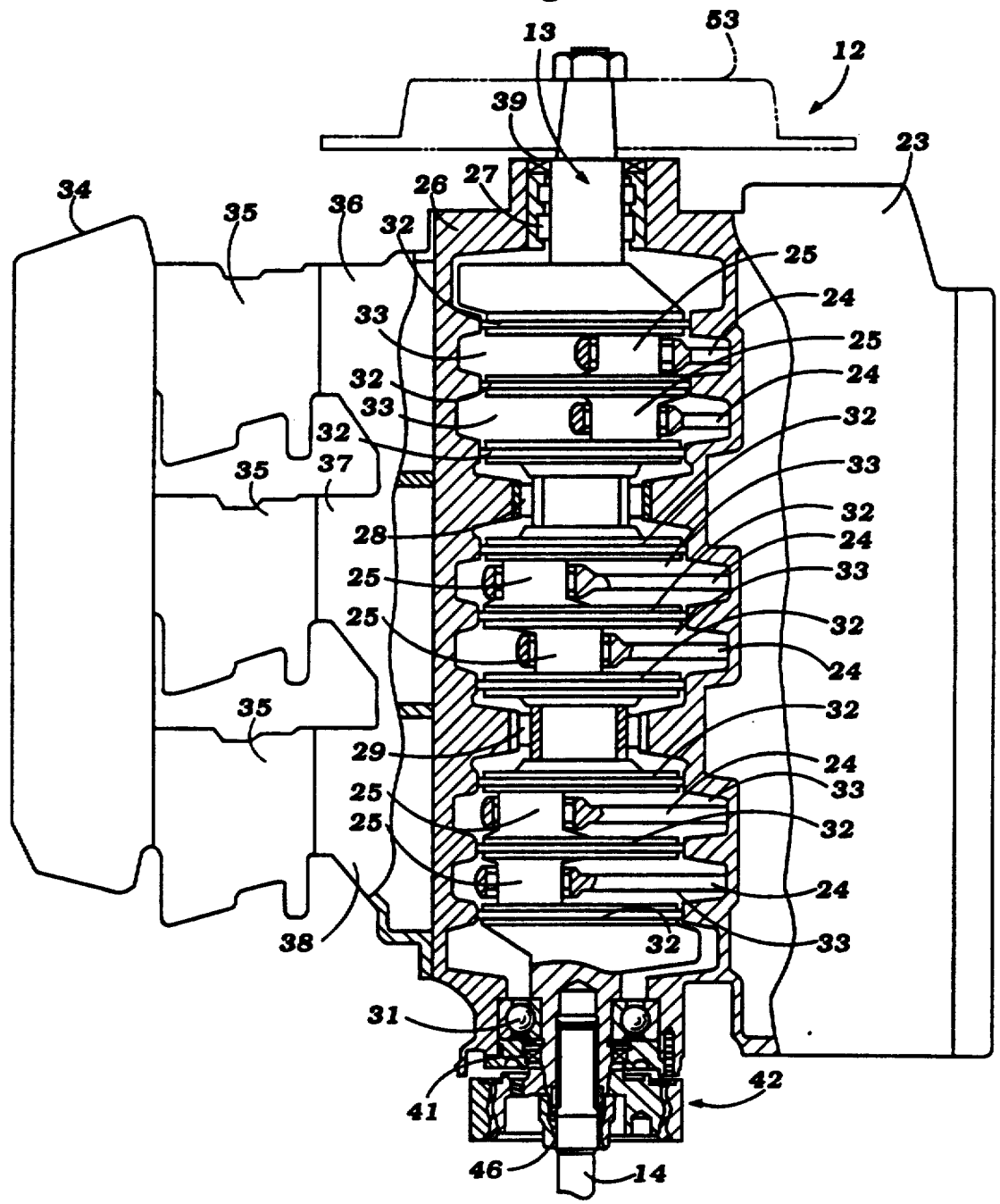
FIG. 2 is an enlarged side elevational view of the engine of the outboard motor, with a portion shown in section.
Figure 3:
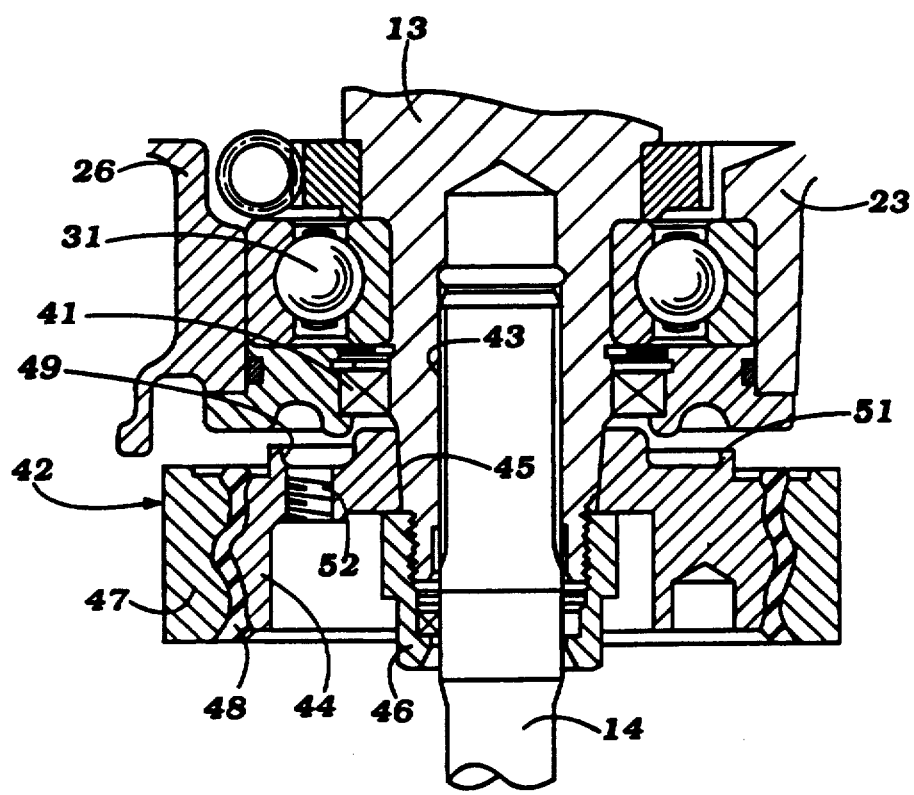
FIG. 3 is a further enlarged cross-sectional view showing the torsional damper associated with the engine.

Referring now in detail to FIGS. 2 and 3, the engine 12 is depicted as being of the V6, two-cycle, crankcase compression internal combustion engine type. However, the invention can be utilized in conjunction with engines having other numbers of cylinders, other cylinder configurations or, for that matter, engines other than reciprocating engines. Since the construction of the engine per se forms no part of the invention, only a general description of it will be made.

The engine 12 includes a cylinder block assembly 23 having pairs of cylinder banks in which pistons reciprocate. These pistons are connected by means of connecting rods 24 to individual throws 25 of the crankshaft 13. A crankcase 26 is affixed in a known manner to the cylinder block 23 and carries a plurality of spaced main bearings 27, 28, 29 and 31 for rotatably journaling the crankshaft 13 therein. As is conventional with two-cycle engine practice, the crankshaft 13 is provided with sealing members 32 that seal the individual crankcase chambers 33 associated with each cylinder bore from each other.

A fuel/air charge is delivered to each of the crankcase chambers 33 from an induction system that includes an air inlet device 34 that supplies air to a plurality of carburetors 35. The carburetors 35, in turn, form a fuel/air charge and deliver it to the individual chambers through a manifold having runners 36, 37 and 38. Reed-type check valves (not shown) prevent reverse flow from the crankcase chambers 33 back to the induction system as thus far described.

The engine 12 is also provided with a lubrication system which may comprise a means for mixing lubricant with the fuel supplied to the carburetors 35 or some form of direct lubrication system.

In order to prevent leakage from the crankcase chambers, there is provided an upper seal 39 which is disposed immediately above the upper main bearing 27 and a lower seal 41 that is disposed immediately adjacent and below the lower main bearing 31.

A torsional damper, indicated generally by the reference numeral 42, is affixed to the lower end of the engine output shaft 13 where it has a splined connection 43 to the upper end of the drive shaft 14. In this way, the torsional damper 42 will dampen pulsations in the output shaft of the engine and also any torsional vibrations in the drive shaft 14. The torsional damper 42 includes a hub member 44 having a tapered portion 45 that is affixed to the lower end of the crankshaft 13 by a fastening nut 46. If desired, a key also may be incorporated in this connection so as to insure that the torsional damper 42 will rotate with the output shaft 13.

The torsional damper 42 further includes an inertial ring 47 that is affixed to the hub member 44 by means of an elastomeric ring 48. The elastomeric ring 48 permits relative rotation between the inertial member 47 and the hub member 44 so as to achieve torsional damping.

It will be noted that the torsional damper 42 is positioned immediately adjacent the seal 41 and with conventional constructions, any oil or fuel which may leak from the crankcase chambers 33 past the seal 41 could impinge upon the elastomeric sleeve 48 and cause it to swell and adversely affect the operation of the damper. In accordance with the invention, however, there is provided an annular groove 49 that is positioned inwardly of the elastomeric ring 48 and which is separated from it by an upstanding wall 51 which acts as a dam. Hence, any lubricant which leaks may be accumulated in the recess 49. This lubricant can then drain through one or more tapped holes 52 formed in the hub which tapped holes are utilized for receiving a puller so as to facilitate removal of the torsional damper 42 from the engine output shaft 13. As a result of this construction, a very simple and yet highly effective construction is provided to insure that the torsional damper 42 will not be adversely affected by lubricant or fuel which may seep through the seal 41, an unavoidable situation.

A flywheel magneto 53 is affixed to the upper end of the crankshaft 13 in a known manner.

It should be readily apparent from the foregoing description that the described construction permits a highly effective torsional damper for an engine having its output shaft disposed in a vertical orientation. The construction is such that lubricant or fuel seeping around the engine output shaft will not adversely affect the damper since this material is trapped before it can reach the elastomeric sleeve of the damper and will be drained externally of it. Also, the drain opening is conveniently provided by means of the threaded openings that are used for the damper puller.

It is to be understood that the foregoing description is that of a preferred embodiment of the invention and that various changes and modifications may be made without departing from the spirit and scope of the invention, as defined by the appended claims.

What is claimed is:

1. A torsional damper for an internal combustion engine having its output shaft journaled in a crankcase for rotation having a vertically extending axis in an engine housing, means for lubricating said output shaft, seal means for sealing said output shaft relative to said engine housing, a torsional vibration damper affixed to said output shaft adjacent and below said seal means for damping pulsations in said output shaft, an oil collecting groove formed in the upper side of said torsional vibration damper in proximity to said seal means for entrapping liquid seeping past said seal means, and a vertically extending drain opening extending from said oil collection groove for permitting oil to be drained therefrom away from the torsional vibration damper.

2. A torsional damper as set forth in claim 1 wherein the drain opening is threaded so as to receive a pulling tool for removal of the torsional vibration damper from the engine output shaft.

3. A torsional damper as set forth in claim 1 wherein the torsional vibration damper comprises a hub, an annular inertial member, and an elastomeric sleeve for securing said inertial member to said hub.

4. A torsional damper as set forth in claim 3 wherein the oil collecting groove is formed in the hub.

5. A torsional damper for an internal combustion engine having its output shaft journaled in a crankcase for rotation about a vertically extending axis in an engine housing, means for lubricating said output shaft, seal means for sealing said output shaft relative to said engine housing, a torsional vibration damper comprising a hub, an annular inertial member, and an elastomeric sleeve for securing said inertial member to said hub, said hub being affixed to said output shaft adjacent and below said seal means for damping pulsations in said output shaft, an oil collecting groove formed in the upper side of said hub in proximity to said seal means for entrapping liquid seeping past said seal means, and an upstanding dam formed around said oil collecting groove and between said oil collecting groove and said elastomeric sleeve.

6. A torsional damper as set forth in claim 5 further including a vertically extending drain opening extending from the oil collecting groove for permitting oil to be drained therefrom away from the torsional vibration damper.

7. A torsional damper as set forth in claim 6 wherein the drain opening is threaded so as to receive a pulling tool for removal of the torsional vibration damper from the engine output shaft.

8. A torsional damper for an internal combustion engine having its output shaft journaled for rotation about a vertically extending axis in an engine housing, seal means for sealing said output shaft relative to said engine housing, a torsional vibration damper affixed to said output shaft adjacent and below said seal means for damping pulsations in said output shaft, an oil collecting groove formed in the upper side of said torsional vibration damper for entrapping liquid seeping past said seal means, and a vertically extending drain opening extending from said oil collecting groove for permitting liquid to be drained therefrom away from the torsional vibration damper.

9. A torsional damper as set forth in claim 8 wherein the drain opening is threaded so as to receive a pulling tool for removal of the torsional vibration damper from the engine output shaft.

10. A torsional damper as set forth in claim 8 wherein the torsional vibration damper comprises a hub, an annular internal member, and an elastomeric sleeve for securing said inertial member to said hub.

11. A torsional damper as set forth in claim 10 wherein the oil collecting groove is formed in the hub.

12. A torsional damper as set forth in claim 11 further including an upstanding dam formed around the oil collecting groove and between the oil collecting groove and the elastomeric sleeve.

13. A torsional damper as set forth in claim 12 further including a vertically extending drain opening extending from the oil collecting groove for permitting oil to be drained therefrom away from the torsional vibration damper.

14. A torsional damper as set forth in claim 13 wherein the drain opening is threaded so as to receive a pulling tool for removal of the torsional vibration damper from the engine output shaft.

15. A torsional damper for an internal combustion engine having its output shaft journaled for rotation about a vertically extending axis in an engine housing, seal means for sealing said output shaft relative to said engine housing, a torsional vibration damper comprising a hub, an annular inertial member and an elastomeric sleeve for securing said inertial member to said hub affixed to said output shaft adjacent and below said seal means for damping pulsations in said output shaft, an oil collecting groove formed in the upper side of said torsional vibration damper for entrapping liquid seeping past said seal means, and an upstanding dam formed around said oil collecting groove and between said oil collecting groove and said elastomeric sleeve.

* * * * *

UNITED STATES PATENT AND TRADEMARK OFFICE
CERTIFICATE OF CORRECTION

PATENT NO. : 5,074,812
DATED : December 24, 1991
INVENTOR(S) : Eifu Watanabe

It is certified that error appears in the above-identified patent and that said Letters Patent is hereby corrected as shown below:

Column 4, line 11, Claim 1, "having" should be --about--.

Column 4, lines 20-21, Claim 1, "collection" should be --collecting--.

Column 5, line 10, Claim 10, "internal" should be --inertial--.

Signed and Sealed this

Thirty-first Day of August, 1993

Attest:

BRUCE LEHMAN

*Attesting Officer*  *Commissioner of Patents and Trademarks*